United States Patent

Nakano

[15] 3,652,030

[45] Mar. 28, 1972

[54] TAPE REELING MECHANISM ON VIDEO TAPE RECORDER

[72] Inventor: Tatsumi Nakano, Tokyo, Japan

[73] Assignee: Akai Electric Co., Ltd., Tokyo, Japan

[22] Filed: July 7, 1970

[21] Appl. No.: 52,906

[30] Foreign Application Priority Data

July 7, 1969 Japan....................................44/64185

[52] U.S. Cl. ............................................242/201, 274/11 D

[51] Int. Cl. ......................................B11b 15/32, G03b 1/04

[58] Field of Search ..........................242/201–204, 206–210; 274/4 D, 11 D

[56] References Cited

UNITED STATES PATENTS 2,951,653 9/1960 Haenel....................................242/201

3,073,540 1/1963 Gvest......................................242/201

3,085,758 4/1963 Herrmann et al.........................242/201

3,317,152 5/1967 Fukatsu...................................242/201

*Primary Examiner*—Leonard D. Christian

*Attorney*—Sughrue, Rothwell, Mion, Zinn & Macpeak

[57] ABSTRACT

The invention relates to a tape reeling mechanism of a video tape recorder, having a rotatable, tape delivery reel support and a rotatable tape wind-up support. The improvements comprises a positioner slide having a substantially triangular opening and arranged between two operation control push buttons, on the one hand, and a drive wheel and idle roller assembly on the other hand, which is pivotably mounted on the panel of the recorder between the reel supports, and a lever pivotably mounted on the panel and having a pin engageable with the opening, the lever being positively held in its neutral position by engagement of the pin with the central apex of the triangular opening.

4 Claims, 7 Drawing Figures

TAPE REELING MECHANISM ON VIDEO TAPE RECORDER

The present invention relates broadly to improvements in and relating to video tape recorders.

More specifically, it relates to the improvements in the tape reeling mechanism of the video tape recorder, especially of the portable use.

In this kind of reeling mechanism, it is a substantial drawback inherent in the prior technique to position in a highly stabilized way a drive change-off and pivotable lever in its off-service position, said lever carrying a driving wheel to which driving torque is transmitted from a certain prime mover, said wheel being in this sense acting at the same time as a driven wheel.

The main object of the invention is to provide an improved reeling mechanism in which the motion-change-off means is locked in its neutral position in a highly positive way.

A further object is to provide an improved tape reeling mechanism of the kind above referred, capable of obviating malfunction and/or mechanical troubles caused by frequently invited loose positioning of the motion-change-off means of the above kind, when it is positioned in its off-service situation.

These and further objects, features and advantages of the invention will become more apparent when read the following detailed description of substantially a preferred embodiment of the invention by reference to the accompanying drawings, in which.

Figure 1:
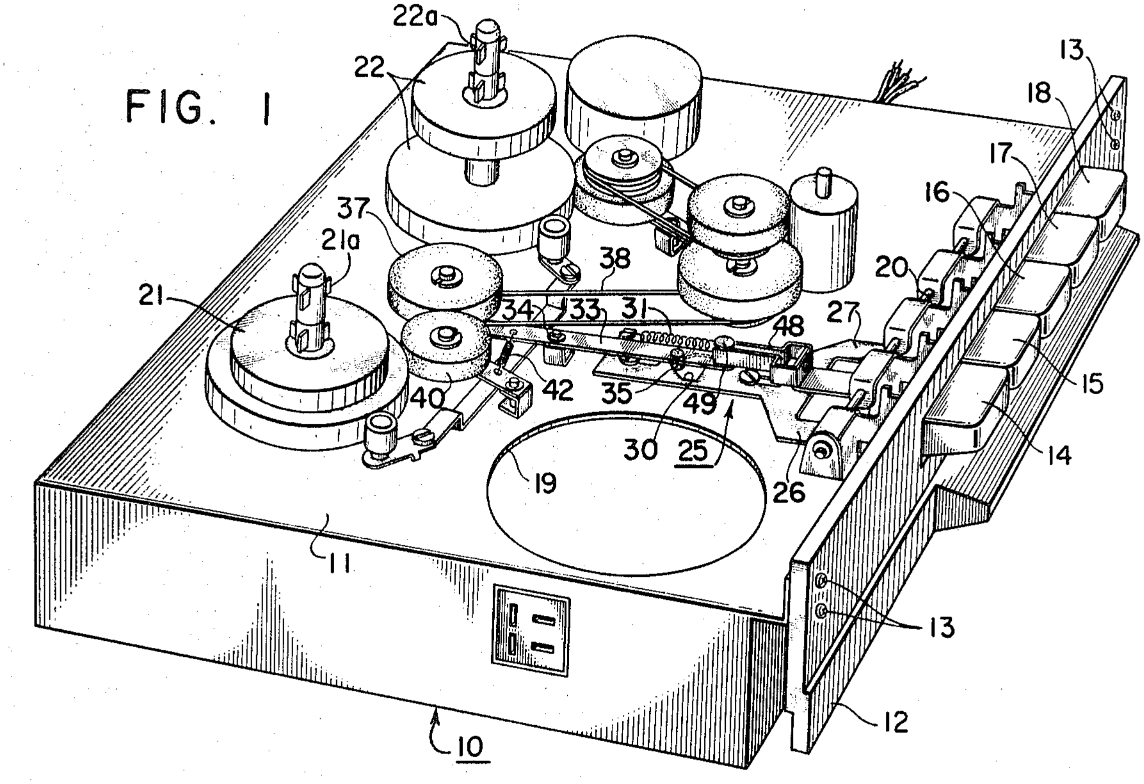
FIG. 1 is a perspective view of a video tape recorder fitted with a tape reeling mechanism, wherein, however, the stationary tape guide drum, rotary heads and the like conventional elements have been omitted from the drawing for clearer representation thereof.

Referring now to FIG. 1 of the accompanying drawings, numeral 10 represents a box-shaped housing of a portable video tape recorder which is covered detachably with a deck panel 11, although its attaching means have been omitted from the drawing on account of its very popularity.

A front plate 12 is rigidly attached to the housing 10 by means of several set screws commonly shown by a sole reference numeral 13.

A series of operation control push buttons 14–18 are arranged in line and mounted pivotably on the front plate 12. The push buttons 14 and 15 serve respectively for the quick return and the quick feed of the magnetic tape which has been, however, omitted from the drawing for clearer representation of other main working parts. The button 16 serves for reset service for all other control push buttons. The button 17 serves for the playing service which means that it closes several electrical switches including that for the tape reeling motor, all being not shown, are closed, thereby the electronic circuits contained in the housing 10 being naturally brought into their ready-for-service condition. The final button 18 serves for the recording purpose.

The panel 11 is formed with a circular opening 19 for reception of a stationary tape guide drum, not shown. Several conventional tape guide posts and stationary magnetic heads used for the audio service have also been omitted for simplicity.

Numeral 21 represents a tape supply or delivery reel support and 22 denotes a tape winding reel support, these supports being made rigid with their respective shafts **21*a* and 22*a* which are rotatably mounted on panel 11**, as conventionally.

Figure 4:
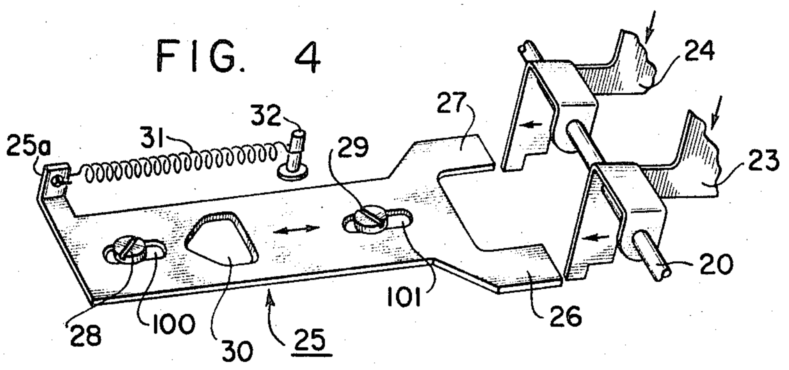
FIG. 4 is a perspective view of a positioned slide and parts of push buttons cooperating therewith.
Figure 5:
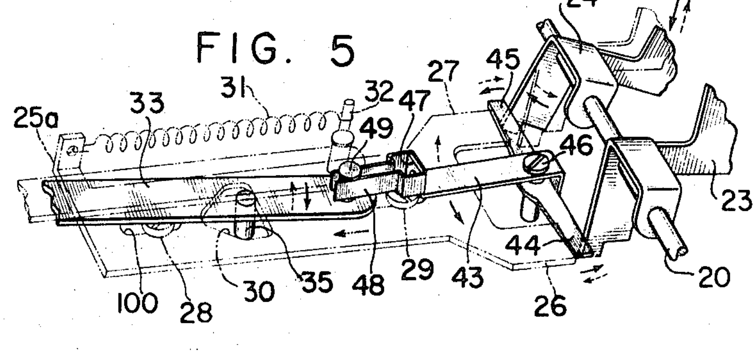
FIG. 5 is a perspective view of several motion-transmitting members cooperating with said positioner slide which is shown in chain-dotted line.

Buttons 14 and 15 are fitted integrally with actuators 23 and 24, respectively, as most clearly be seen from FIGS. 4 and 5. These actuators 23 and 24 are pivotably mounted on a horizontally extending stationary supporting rod 20 fixedly mounted on the bottom plate, not shown, of the box housing 10 through the intermediary of proper pedestals, again not shown.

Positioner slide 25 is slidably mounted on the panel 11 and formed at its rear end with a pair of motion-receiving projections 26 and 27 which are adapted for cooperation with said actuators 23 and 24, respectively, as most clearly be seen from FIG. 5. The positioner slide 25 is formed a pair of separated and axially extending guide slots 100 and 101 slidably cooperating with two guide pins 28 and 29 which are studded on the panel 11. In this way, the slide 25 is adapted for moving along its longitudinal axis, as most clearly be seen from FIG. 4.

In addition, the positioner slide 25 is formed with a substantially triangular slot 30, the apex thereof directing along the longitudinal axis thereof and to the front end of the slide. At the front end of the slide 25, an upwardly directing projection **25*a* and a tension coil spring 31 is tensioned between the said projection and a stationary post 32 which is rigidly mounted on the panel 11**.

Figure 2:
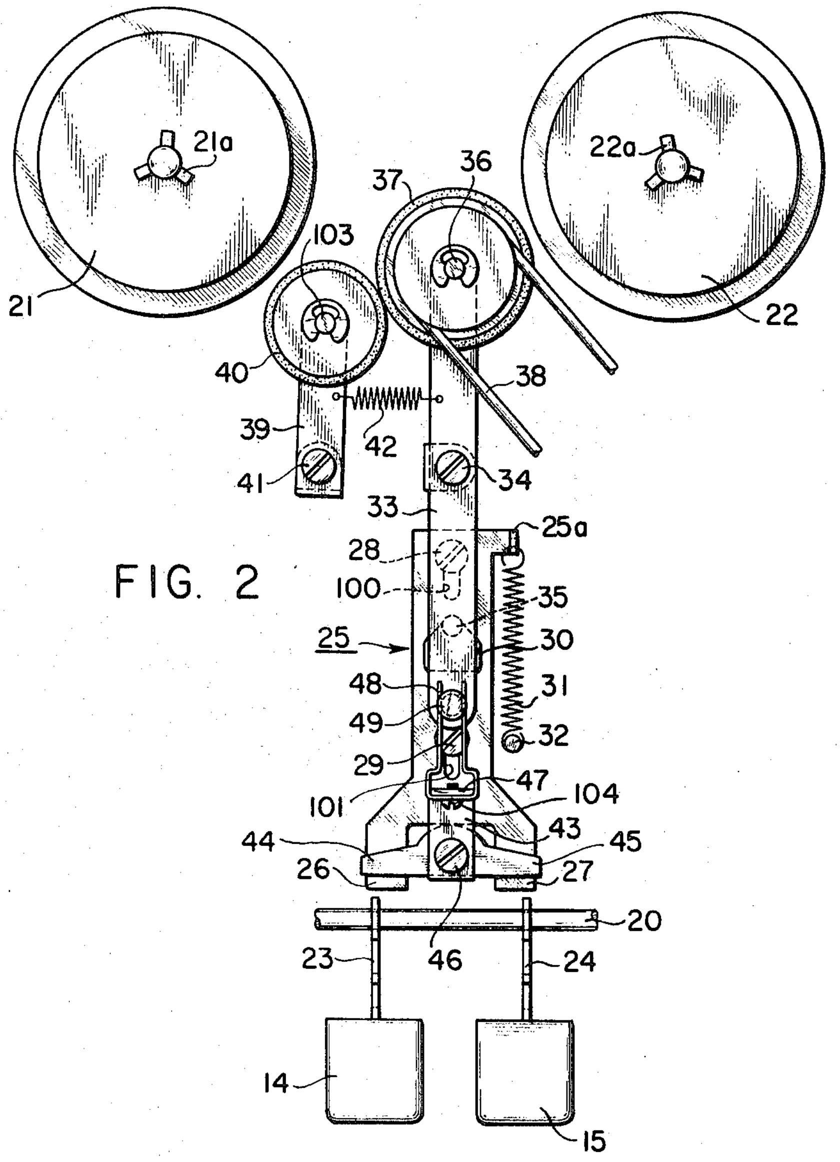
FIG. 2 is a plan view of essential parts of the tape reeling mechanism shown in its off-service position.
Figure 6:
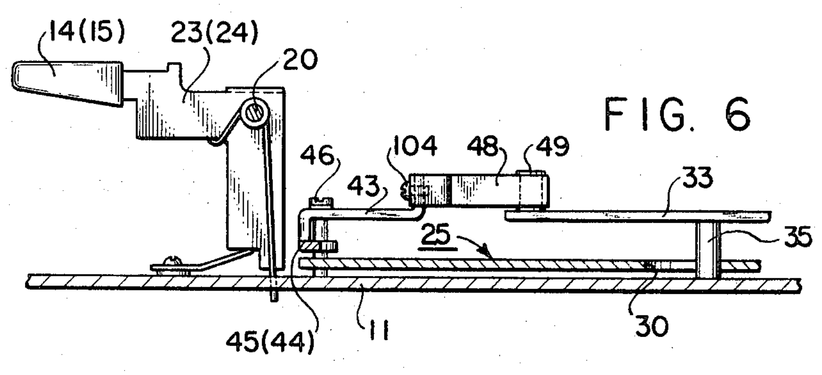
FIGS. 6 and 7 are elevational views of several main working parts of the tape reeling mechanism, wherein, however, the deck panel of the machine and the said positioner slide are illustrated in their section.

Under the influence of the urging force exerted by this tension spring 31, the positioner slide 25 will occupy normally its position shown in FIG. 2. This position represents the off-service one of the tape reeling mechanism.

Numeral 33 denotes a lever which is pivotably mounted at 34 on the panel 11 and formed rigidly with a depending pin 35 provided at an intermediate position in proximity of the front end of said lever, the last mentioned pin 35 projecting into the triangular opening 30. A driven pulley 37 is rotatably mounted on a shaft 36 which is rigidly supported on the front end of the pivotable lever 33. The driven pulley 37 is adapted for receiving a driving torque through a belt 38 from a drive wheel assembly 102 which is rotatably mounted on the panel 11 and mechanically connected with a drive electric motor, not shown.

An idler lever 39 is pivotably mounted at 41 on the panel 11 and mounts rigidly at its free end portion a shaft 103 which rotatably mounts an idler pulley 40.

A tension pring 42 is tensioned between the levers 33 and 39, thereby the idler roller 40 being kept in engagement with the driven pulley 37.

When the pivotable lever 33 is pivoted in clockwise direction from the position shown in FIG. 1, the driven wheel 37 is brought into engagement with the periphery of the lower part of the reel support 22 for driving the latter.

On the contrary, when the lever 33 is pivoted in counter clockwise direction from the position shown in FIG. 2, the idler roller 40 is brought into engagement with the opposite reel support 21 for driving the latter.

An actuator lever 43 is pivoted at 46 on the panel 11 and formed at its rear end with a pair of wings 44 and 45 in corresponding to said actuators 23 and 24, respectively, when seen in their top plan view. But, these wings are arranged not interfere with the motion-receiving projections 26 and 27, respectively. At the front end of lever 43, a channel piece 47 is rigidly attached by means of set screw 104 and elongated spring arms 48 extending forwardly from the channel piece. These spring arms 48 have each an enough length to cooperate with a pin 49 which is rigidly mounted on the rear end of said pivotable lever 49.

As was briefly hinted hereinbefore, all the constituents of the tape reeling mechanism so far shown and described are positioned under the influence of the urging force exerted by the spring 31, when the mechanism is not positioned in its quick return or quick feed service position. When the operator of the machine depresses the push button 15 for performing a quick tape feed operation (or, when a change-off lever, not shown, is set to its quick tape feed position), the actuator 24 is moved upwards in FIG. 1 and the motion-receiving projection 27 is actuated upon, thus the pivotable lever 25 being shifted upwards forcibly against the action of spring 31.

In this way, the hitherto established engagement between the depending pin 35 on the pivotable lever 33, on the one hand, and the apex of the triangular opening 30 in the lever 25, on the other, will be released, thus the lever 33 being ready for performing a rotational movement when a certain urging force in that sense be applied to.

As a next following step, the actuator 24 strikes against the right-hand wing 45 so as to rotate the lever 43 in counter-clockwise direction in FIG. 1 around its pivot 46. By this pivotal movement of the lever 43, the right-hand side spring arm 48 urging the pin 49 so as to pivot the lever 33 in clockwise direction around its pivot 34, thereby the driven roller 37, which has been brought beforehand into rotation by depressing, for instance, the play control push button 17, being brought into driving connection with the tape windup reel 22, thus the latter being brought into a high speed rotation. By the conventional lockingly maintenance of the depressed push button 15 (or, instead thereof, a corresponding change-off lever of conventional design) in the position shown in FIG. 3, the desirous quick tape feed operation will be continued unless said locking condition brought about by conventional means highly well known to those skilled in the art is not released.

For termination of the once initiated quick tape feed operation, the depressed push button 15 must be restored to its initial off-service position, as is easily thought out by any person skilled in the art. Depression of the stop button 16 or the quick return control button 14 will do. By this operation, the precedingly depressed button 15 is returned to its initial or raised position through the conventional lock-release means of conventional design, not shown.

Figure 3:
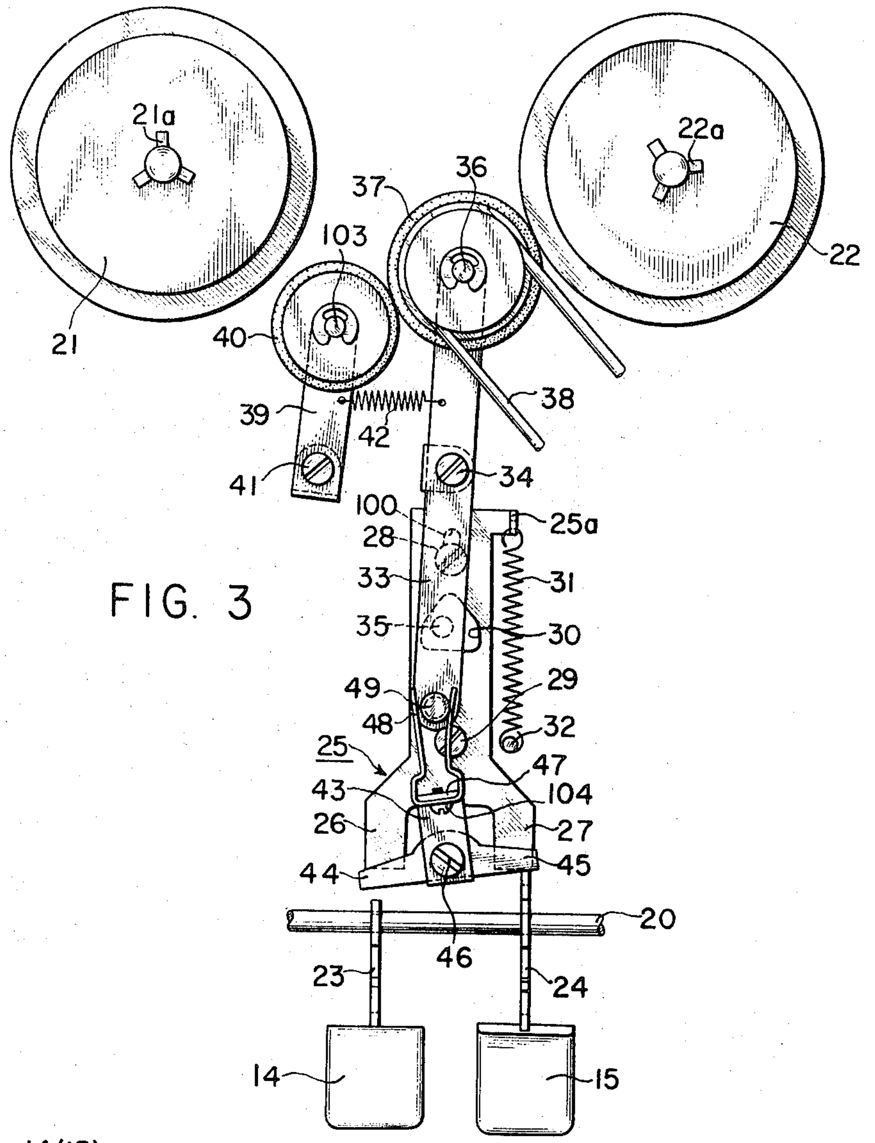
FIG. 3 is a similar view to FIG. 2, illustrating, however, the same mechanism in its working position.
Figure 7:
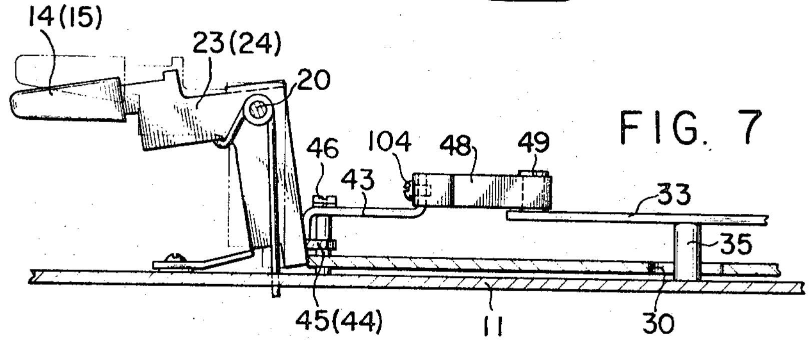

By this operation, the actuator 24 is returned from the position shown in FIG. 3 to that shown in FIG. 2. This return movement will be more clearly understood from FIG. 7. The return movement corresponds to the shift from the full line position to the chain-dotted line one shown therein.

During this return shift of the button 15, the positioning lever 25 slides downwards in FIG. 3 from the position shown therein to that shown in FIG. 2, under the influence of the urging force exerted by spring 31. During this lowerward movement of the positioner slide 25, the pin 35 on the pivotable lever 33 is guided by the corresponding inclined side wall of the triangular opening 30 and finally is brought into the apex of said triangular opening. During this movement, the lever 33 is rotated in counter clockwise direction, thus the driven wheel 37 being disengaged from driving contact with the reel support 37 and the quick tape feed being thereby terminated, while the said engagement of pin 35 with the apex of the triangular opening 30 will provide a positive lock of the pivotable lever 33 in the off-service position shown in FIG. 1.

For performing the quick return or rewinding operation, the corresponding push button 14 is depressed so as to actuate the actuator 23 to bring the projection 26 on lever 33 into actuating contact with the left-hand wing 44. In this case, the lever 33 is rotated in counter clockwise direction in FIG. 1. Therefore, rotational torque is transmitted from the wheel 37 through idler 40 to the tape supply reel 21. The resetting operation is brought about in the same manner as referred to above. Then, all the constituents are brought to their initial position shown in FIG. 1.

I claim:

1. In a tape reeling mechanism of a video tape recorder comprising a deck panel, a tape delivery reel and a tape wind-up reel, the both being rotatably mounted relative to said panel, a lever pivotably mounted on said panel, a drive wheel rotatably mounted on said lever and adapted for engagement with one of said reels by pivotally shifting said lever in one direction, an idler roller pivotably mounted on said panel and kept permanently in contact with said drive wheel and adapted for cooperation with the remaining one of said reels, a first operation control member adapted for being linked with said lever for bringing said drive wheel into its cooperating position with said first reel by actuation of said control member, and a second operation control member again adapted for being linked with said lever for bringing said idle wheel into its cooperating position with remaining or second reel, the improvements comprises a positioner slide slidable relative to said lever, a substantially triangular opening formed in said slide and a pin mounted on said lever and extending into the area defined by said opening, said lever being locked in its neutral position with said pin kept in engagement with an apex of said triangular opening.

2. Tape reeling mechanism as set forth in claim 1, further comprising a tension spring tensioned between said positioner slide and a post fixedly mounted on said panel, and a pair of pin-and-groove connections formed between said slide and said panel.

3. Tape reeling mechanism as set forth in claim 1, further comprising a second lever mounted pivotable relative to said panel and positioned in proximity to said two operation control members for being actuated upon selectively by either of these members, a pair of spring arms fixedly mounted on said second lever and extending therefrom beyond one end of said first lever, and a pin fixedly mounted on said end of said first lever so as to receive a lateral resilient urging force exerted thereupon selectively by either of said spring arms depending upon the selective actuation of either of said operation control members.

4. Tape reeling mechanism as set forth in claim 1, wherein said first operation control member is a first push button destined for tape quick return service and said second operation control member is a second push button destined for tape quick feed service.

* * * * *